Aug. 14, 1962 R. TRUPIANO ET AL 3,049,405
PROCESS FOR THE PREPARATION OF ARTIFICIAL CRYOLITE
Filed Dec. 31, 1959 2 Sheets-Sheet 1

Inventors:
Roberto Trupiano and
Domenico Zanon
By: B.F. Schleinger
Attorney

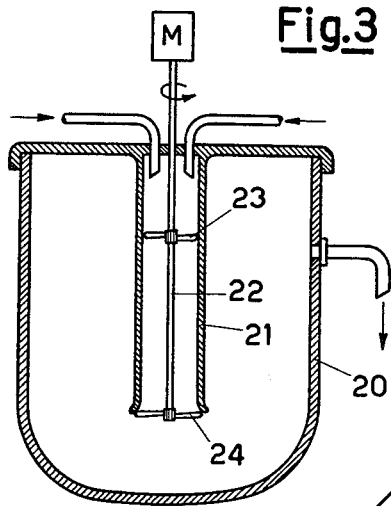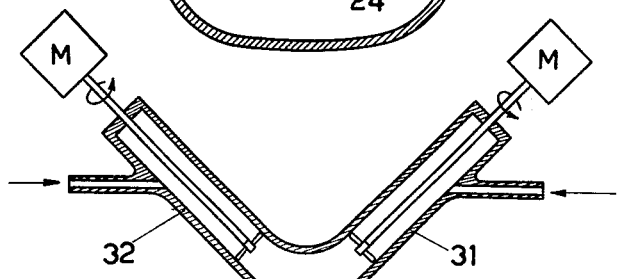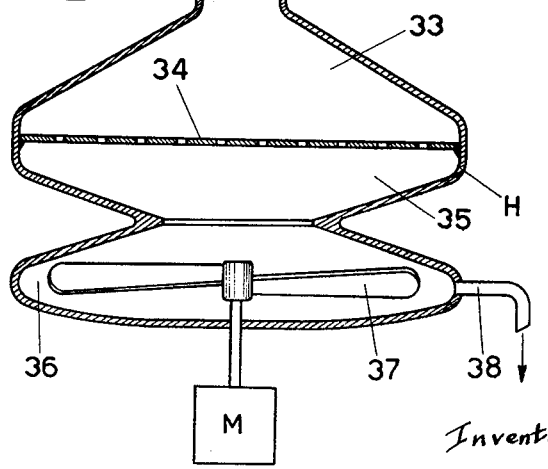

United States Patent Office 3,049,405
Patented Aug. 14, 1962

3,049,405
PROCESS FOR THE PREPARATION OF
ARTIFICIAL CRYOLITE
Roberto Trupiano and Domenico Zanon, Milan, Italy, assignors to I.C.P.M. S.p.A. Industrie Chimiche Porto Marghera, Milan, Italy, a company of Italy
Filed Dec. 31, 1959, Ser. No. 863,284
Claims priority, application Great Britain Jan. 8, 1959
1 Claim. (Cl. 23—88)

This invention relates to a process for the preparation of artificial cryolite.

It is an object of this invention to provide a process for the production of high purity artificial cryolite (sodium fluoaluminate) having a weight ratio of NaF to $AlF_3$ equal very nearly to that of natural cryolite (approx. 1.5) and, more particularly, a process which makes it possible to precipitate sodium fluoaluminate having the required composition even when considerable amounts of acid (e.g. HCl, $H_2SO_4$, etc.) are evolved from the precipitation reaction.

It is known that, especially in an acidic environment, the precipitation of artificial cryolite is not quantitative and that the precipitated sodium fluoaluminate undergoes a degradation towards undesirable products having a NaF to $AlF_3$ ratio lower than that of natural cryolite. The physical characteristics of these products vary widely and can be qualitatively inferior to those of natural cryolite, if for instance, these products are decomposed, in an electrolytical reduction bath for the production of aluminum, at lower temperatures and much more rapidly than occurs with natural cryolite and thus, greater volatilization losses are likely to take place.

It has been found that the composition of the sodium fluoaluminate which has precipitated depends, aside from the acidity and the temperature, on the reaction volume and on the instantaneous concentration of the elements which take part in the precipitation reaction; more precisely, it has been seen that, if the reaction takes place in a large volume so that the instantaneous concentrations of the reactants are low, the above indicated ratio NaF to $AlF_3$ for the resultant cryolite is low and so are also the precipitation yields. Expressed in another way, the greater the reaction volume, the lower are the yields and the lower the NaF to $AlF_3$ ratio of the precipitated sodium fluoaluminate.

It has furthermore been seen that, when, for instance, the artificial cryolite is precipitated from a solution of fluoaluminic acid (i.e. hydrogen aluminum fluoride $H_3AlF_6$) by addition of a sodium salt thereto, the precipitate reacts with the fluoaluminic acid which causes aluminum fluoride to separate, leaving in solution free hydrogen fluoride: this phenomenon takes place to a greater extent the greater the acidity of the environment in which the precipitation takes place, and the higher the temperature at which the reaction is caused to occur.

The phase "solution of fluoaluminic acid," as employed in this specification, is intended to designate, for the sake of simplicity, either a solution of fluoaluminic acid (corresponding for example to the formula $H_3AlF_6$), or a solution of aluminum fluoride made acidic by hydrofluoric acid: it is intended that, in either solution, the ratios $AlF_3$ to HF may vary within wide limits.

When the cryolite is precipitated, for example, from a solution containing fluorine and aluminum in the desired ratios, by a sodium salt, as the precipitated sodium fluoaluminate (artificial cryolite) is separated, the acid, corresponding to the anion of the employed sodium salt, is set free. If sodium carbonate is employed, the carbonic acid formed is removed from the solution as carbon dioxide and the solution remains neutral. If, on the other hand, a sodium salt is employed other than sodium hydroxide and sodium carbonate, the anion acidifies the environment in which the precipitation takes place.

It is thus an object of this invention to provide, inter alia, a chemical process that makes it possible to employ, as the sodium salt, sodium chloride (which, as is known, is a virtually inexpensive sodium source), thus preventing the precipitation of artificial cryolite having a low NaF to $AlF_3$ ratio, and also avoiding the shortcoming of the low reaction yields caused by the formation of hydrogen chloride during the precipitation of the cryolite.

According to the present invention, therefore, we provide a process for the production of artificial cryolite, by reaction between a first solution containing fluorine and aluminum with a second solution containing the sodium ion, comprising the steps of intimately and instantaneously combining said solutions at a temperature comprised, for example, between 20° C. and 70° C., removing the produced artificial cryolite immediately on precipitation, and maintaining under continuous stirring the so-collected cryolite for at least one hour at a temperature, for example, lower than 60° C.

The requirements for an intimate and instantaneous contact between the solutions to be reacted is of an imperative nature, since, as has been pointed out in the foregoing, it has been ascertained that, if the fundamental reaction of the process is made to take place in a comparatively small volume with respect to the whole mass of the reactants and at high speed, providing at the same time for removing the precipitated cryolite immediately as it is formed, the reaction conditions are thus made such as to approach, in the closest, the ideal condition of having one molecule of fluoaluminic acid in contact with three molecules of sodium chloride at a time.

According to a preferred embodiment, the process of the invention provides, for the production of artificial cryolite, the use of a solution of fluoaluminic acid from which the cryolite is subsequently precipitated by a solution of sodium chloride.

The preparation of fluoaluminic acid can be made according to any known method, for example, from aluminum oxide ($Al_2O_3$) or from aluminum hydroxide ($Al(OH)_3$) and preferably pure HF in any form, such as gaseous, liquid or in solution, or from recovered mother liquors. The required solution of fluoaluminic acid can also be prepared by dissolving aluminum oxide or hydroxide in the same hydrochloric acid solution resulting as mother liquors from the precipitation of the cryolite, and subsequently adding a hydrogen fluoride solution.

In the preparation of fluoaluminic acid the molar ratio of the employed quantity of HF to that of $AlF_3$ must not be lower than the corresponding ratio of NaF to $AlF_3$, which is desired to be obtained in the end product.

The concentration of the fluoaluminic acid in the solution employed in the precipitation reaction directed to obtaining artificial cryolite, varies for example from 100 to 300 grams per liter so as to avoid the decomposition of fluoaluminic acid and the inherent separation of aluminum fluoride; the temperature is kept between 60° C. and 110° C.

To the solution containing fluoaluminic acid, or rather aluminum and fluorine in the desired ratio, the solution of sodium chloride is added, at a concentration ranging from about 20 to about 27 percent by weight, which can be previously purified from calcium, magnesium, iron, etc., according to any of the known processes.

An important improvement afforded by this invention is that the mixing of the solution of sodium chloride with the one containing fluorine and aluminum takes place in a reactor, in such a way that the inflowing solutions are admixed intimately, instantaneously, and in the least possible volume, wheras the suspension of the artificial cryolite thus obtained is immediately removed from any further action of the two reactive solutions.

The temperature is kept, during the reaction stage, between 20° C. and 70° C.

Subsequently the cryolite is transferred to an apparatus where, for a period of time variable, for instance, from 1 to 8 hours (a stage which might be called a "conditioning stage"), it is kept in suspension with stirring and at a temperature which is varied according to the desired final characteristics of the cryolite. For the conditioning stage, a temperature lower than 60° C. is preferred.

An artificial cryolite is thus obtained, with high yields, having a composition and physical characteristics very near to those of natural cryolite.

The cryolite suspension, discharged from the conditioning apparatus, is conventionally treated or filtered and reslurried in water in order that a complete removal of any acidity from the filter cake may be obtained: conventional methods, such as decantation, thickening, filtering or the like may also be adopted to this end, provided that they be capable of ensuring a thorough washing of the filter cake.

The cryolite precipitate thus obtained has a jelly consistency but it can easily be filtered and is particularly suitable for obtaining a granular product.

By varying the conditioning data, for example, the volume, the time, and the temperature, a product having a different physical structure, e.g. a crystalline product, can be obtained.

The process of this invention can also be practised according to an alternative embodiment thereof, in which the reaction for obtaining artificial cryolite is made to take place by combining a first solution containing sodium ions, a second solution containing aluminum ions, and a third solution containing fluorine ions, the remainder of the process taking very much the same course as hereinbefore described. More particularly, artificial cryolite can be obtained, by the process of the present invention, by admixing, in the same reactor, hydrofluoric acid (i.e. an aqueous solution of hydrogen fluoride), a solution of aluminum chloride, and a solution of sodium chloride.

The solution of aluminum chloride can be prepared by dissolving some aluminum hydroxide in the solution of hydrochloric acid contained in the mother liquors from the precipitated cryolite, at a temperature ranging from 50° C. to 80° C.

It has been found that, even though the cryolite obtained with NaCl precipitates in a very acidic environment due to the presence of HCl, it is also possible, by operating under the above described conditions, to obtain pure cryolite exhibiting a high NaF to $AlF_3$ ratio.

It has been outlined in the foregoing that the reaction volumes must, according to this invention, be kept as low as practicable in order that satisfactory yields may be obtained: the reactors or reaction vessels used in the process of this invention should consequently be such as to ensure the fulfillment of the fundamental requirement indicated above.

Some suitable or recommended types of reactors will be now described by way of example only, it being understood that we do not wish to be limited to any particular reactor.

An apparatus adapted for performing the two-solution process described above may comprise, for example, a first cylindrical tube, a second cylindrical tube section of a substantially shorter length than the first tube and arranged in coaxial relation therewith, adapted to internally contain a helical nozzle, one of the two solutions being fed in the annular space between said first and second tubes, the other solution being sprayed through said helical nozzle against the solution flowing along the inner wall of said first tube. By this apparatus, an intimate and instantaneous contact between the two solutions is obtained by contacting either solution in finely divided form (spray), with the other solution maintained in streamline flow conditions. A satisfactory performance of the chemical process according to the invention may also be achieved by employing a reactor of the kind in which a whirling motion is imparted to the reacting solutions which are fed thereto in small volumes according to the basic principle of the process. Some reactors of this particular kind will also be described by way of example only.

The invention will now be described in connection with a few operative examples thereof and having reference to the accompanying drawings, in order to afford a clear understanding of the process run and of a few kinds of apparatus adapted to perform the process.

In the drawings:

FIGS. 3 and 4 are views similar to FIG. 2 of other reactors which may be profitably used in the process of the invention.

Figure 1:
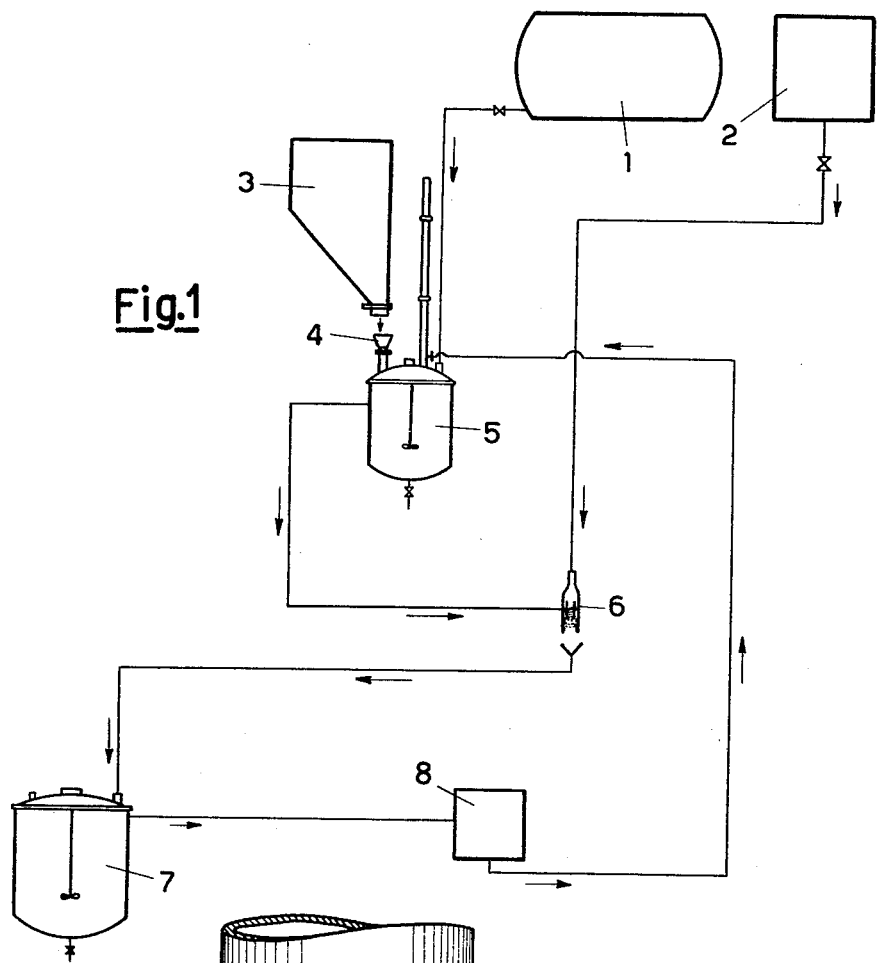
FIG. 1 is a simplified flow-diagram showing the course taken by the process.

Having initially reference to FIG. 1 of the accompanying drawings, it will be appreciated that a system for practicing the process of the present invention essentially comprises a reservoir 1 for hydrofluoric acid, and a second reservoir 2 for holding a solution of sodium chloride, whereas 3 is a silo containing aluminum hydroxide and 4 is a hopper fed by said silo. Hydrofluoric acid coming from 1 and aluminum hydroxide coming from silo 3 via the hopper 4, combine in the vessel 5 equipped with a stirrer unreferenced but altogether visible in the drawing.

The formed fluoaluminic acid and the sodium chloride are combined in the reactor 6 (a preferred embodiment whereof will be described in some detail hereafter) wherefrom the formed artificial cryolite is forwarded to a conditioning apparatus 7 and, after a conditioning period, is sent to a continuous filtering apparatus 8. The diagram also illustrates the recycling of the mother liquors from 8 to 5.

Figure 2:
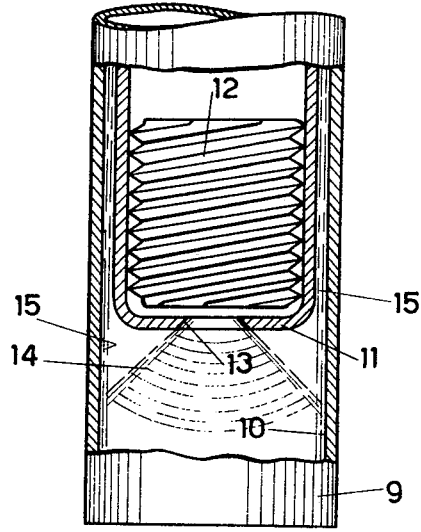
FIG. 2 is an elevation, partly in cross-section, of an apparatus which may be employed in the process according to the invention.

FIG. 2 of the accompanying drawings specifically illustrates a preferred embodiment of the reactor (such as 6 FIG. 1) for performing the process of the present invention and, more specifically the fundamental reaction thereof.

The reactor essentially comprises a first cylindrical tube 9, the inner wall surface whereof is designated by 10 in FIG. 2, a second cylindrical tube 11 arranged in coaxial relation therewith and having a discharge opening 13 in its lower part. A helical nozzle 12, which may advantageously take the form of a multi-start worm, is arranged within the second tube 11, which is of a length shorter than that of the first or main tube 9. One solution is fed through the annular space between the tubes 9 and 11 so as to form a sort of thin liquid layer over the inner wall of said first tube 9. This continuously flowing thin liquid layer is indicated by 15 in FIG. 2. The other solution comes from the tube 11, being sprayed

(14) by the nozzle 12 and meets the downwardly flowing liquid layer 15. Thus, the ideal conditions of intimate and continuous contact between the reacting solutions are efficiently ensured.

FIGS. 3 and 4 of the accompanying drawings show two further kinds of reactors which may be profitably used in carrying out the process of the present invention.

FIG. 3 shows a reactor of a somewhat conventional construction, in which two reactive solutions are admixed in a hollow cylinder 21 having a relatively small volume with respect to that of the reactor outer vessel 20 and coaxially arranged in relation thereto. Within said cylinder is arranged a revolving shaft 22 having blades 23 in correspondence to the central portion of the cylinder 21, as well as to the bottom opening of said cylinder 24: it is believed that the description in the figure is clear enough and no particular description of the apparatus is necessary.

Another kind of reactor adapted to carry out the process of the present invention is diagrammatically shown in FIG. 4.

This reactor 30, essentially comprises two tubes, 31, 32, arranged in Y-shape and housing each a shaft fitted with a helical stirrer; either reactive solution is fed to either branch of the Y and the combined solution reaches a chamber H of generally lenticular shape, divided into an upper and a lower compartment, 33 and 35 respectively, by a foraminous partition such as 34.

The lower compartment 35 of the chamber H communicates with a second lenticular chamber 36 in which a helical blade 37 of a pump is lodged.

The cryolite slurry is discharged via the outlet pipe 38. Motors, such as M, ensure the necessary drive for the rotary parts of the reactors.

A few examples will now follow which are such as to further illustrate the run of the process of the invention, as well as the reaction conditions and the principal parameters involved.

*Example 1*

One hundred kgs. of a solution of hydrogen aluminum fluoride having an average strength of 24% $H_3AlF_6$ are admixed in a reactor (for example the reactor 6 of FIG. 1) with 119 kgs. of a 25% solution of sodium chloride.

The sodium chloride is in excess with respect to the calculated amount of about 2%.

The temperature in the reactor is kept around 70° C.

After a conditioning stage of the duration of 1 hour approx., a slurry is obtained which contains, in suspension, 34.430 kgs. of cryolite having a NaF to $AlF_3$ ratio as high as 1.46.

The mother liquors have a sp. gr. of 1.05 and exhibit the following compositions:

HF=1.54 grs. per liters; HCl=100.9 grs. per liter; NaCl=7.85 grs. per liter.

Cryolite in suspension: 195.6 grs. per liter (dry).

The temperature, during the conditioning stage is kept at 60° C.

*Example 2*

One hundred kgs. of a fluoaluminic acid solution having a strength of 24% is admixed in a reactor with 120.2 kgs. of a 25% solution of sodium chloride (i.e. 3% excess with respect to the theoretical quantity).

The reactor temperature is kept at 68° C. approx.

On completion of the conditioning stage, which in this case lasts 3 hours approx., an artificial cryolite is obtained which exhibits a NaF to $AlF_3$ ratio as high as 1.46.

The mother liquors have a sp. gr. of 1.05 and have the following composition:

HF=1.52 grs. per liter; HCl=100.2 grs. per liter; NaCl=9.44 grs. per liter.

Cryolite in suspension: 195.0 grs. per liter (dry).

The conditioning temperature was 60° C.

*Example 3*

One hundred kgs. of a solution of fluoaluminic acid having a strength of 24% is admixed in a reactor with 125 kgs. of a 25% NaCl solution. In this latter solution, the excess of sodium chloride with respect to the theoretical quantity is of about 7%.

The reaction temperature is maintained at 60° C.

On completion of the conditioning stage (3½ hrs.) one obtains 34.73 kgs. of cryolite having a NaF to $AlF_3$ ratio as high as 1.48. The mother liquors show a sp. gr. of 1.05 and the following compositions:

HF=0.72 gr. per liter; HCl=99.3 grs. per liter; NaCl=13.35 grs. per liter.

Cryolite in suspension: 191.5 grs. per liter (dry).

The conditioning temperature was 52° C.

*Example 4*

10.0 kgs. of hydrofluoric acid are admixed in a reactor with 22.2 kgs. of 20% aqueous aluminum chloride and 29.2 kgs. of 25% aqueous sodium chloride. The excess of sodium chloride with respect to the theoretical quantity is 5%.

The reaction temperature is of about 50° C.

The conditioning stage lasts 3½ hours.

From the conditioning apparatus a slurry is obtained which contains, in suspension, 34.72 kgs. of cryolite having a NaF to $AlF_3$ ratio as high as 1.48.

Cryolite in suspension 171.7 grs. per liter (dry).

The conditioning temperature was 45° C.

*Example 5*

One hundred kgs. of 24% aqueous fluoaluminic acid (mol. ratio=3) have been admixed, in a reactor, with 120.2 kgs. of 25% aqueous NaCl.

The NaCl is in excess of theory by 3%.

The reactor temperature is kept at 15° C.

The reaction products have been conditioned at said temperature of 15° C. for one hour, with stirring.

The cryolite thus obtained has a weight ratio $$\frac{NaF}{AlF_3}$$

as high as 1.48. 

The mother liquors contain 0.85 gram per liter of HF, 10.55 grs. per liter of HCl, and 6.92 grs. per liter of NaCl.

It will be appreciated that the embodiments hereinbefore described are only examples and that variations may be introduced which are well within the purview of those skilled in the art, to suit individual requirements.

What we claim is:

A process for the production of artificial cryolite by reaction between an aqueous solution, which contains the Al and F ions, and an aqueous sodium chloride solution, comprising the steps of spraying one solution continuously onto the other solution while flowing said other solution continuously over a solid surface in a film under streamline flow conditions and while maintaining the temperature at not more than 70° C., of continuously removing the cryolite immediately as precipitated and while in suspension, and of continuously stirring the removed, precipitated cryolite while in suspension for at least one hour at a temperature lower than 60° C., said solid surface being an internal surface of revolution, said other solution being flowed in a generally annular stream over said solid surface during said spraying step, and said one solution being sprayed onto the annular stream of said other solution from a point disposed centrally within said annular stream.

References Cited in the file of this patent

UNITED STATES PATENTS 1,475,158    Howard _____ Nov. 20, 1923

(Other references on following page)

UNITED STATES PATENTS

| | | |
|---|---|---|
| 1,563,536 | Specketer | Dec. 1, 1925 |
| 1,850,017 | Lehrecke | Mar. 15, 1932 |
| 1,873,727 | Specketer et al. | Aug. 23, 1932 |
| 2,021,601 | Hilscher et al. | Nov. 19, 1935 |
| 2,186,433 | Schwemmer | Jan. 9, 1940 |
| 2,487,458 | Marnon et al. | Nov. 8, 1949 |
| 2,769,000 | Van Krevelen et al. | Oct. 30, 1956 |
| 2,831,754 | Manka | Apr. 22, 1958 |
| 2,842,426 | Glocker | July 8, 1958 |
| 2,969,347 | Bellinger et al. | Jan. 24, 1961 |
| 2,974,131 | McLeod | Mar. 7, 1961 |
| 3,007,578 | Wride et al. | Nov. 7, 1961 |

FOREIGN PATENTS

| | | |
|---|---|---|
| 348,274 | Germany | Feb. 3, 1922 |
| 557,722 | Germany | Aug. 26, 1932 |
| 649,818 | Germany | Sept. 6, 1937 |

OTHER REFERENCES

Mellor: "Comprehensive Treatise on Inorganic and Theoretical Chemistry," vol. 5, pages 303–304 (1924), Longmans, Green and Co., New Jersey.